United States Patent Office 2,767,115
Patented Oct. 16, 1956

2,767,115

INSECTICIDAL COMPOSITIONS OF CHLORINATED TURPENTINE HYDROCARBONS AND METHODS OF STABILIZING SAME

Abner Lyndale Schultz, Oberlin, and Robert R. Bloor, Lorain, Ohio, assignors to The B. F. Goodrich Company, New York, N. Y., a corporation of New York No Drawing. Application July 29, 1953,
Serial No. 371,146

14 Claims. (Cl. 167—30)

This invention relates to an insecticidal composition and more particularly refers to a chlorinated mixture of turpentine hydrocarbons and turpentine hydrocarbon derivatives comprising as one ingredient camphene or bornyl chloride or a mixture thereof, and a pinene or a mixture of pinenes which may also contain dipentene as the second essential ingredient, the composition being characterized by having a comparatively low toxicity to warm-blooded animals and a high toxicity to insects, and to a method of stabilizing the insecticidal composition.

An object of this invention is the provision of an insecticidal composition comprising a chlorinated mixture of hydrocarbons derived from turpentine.

Another object is the provision of a chlorinated mixture of hydrocarbons derived from turpentine and having exceptional killing power against insects but a low toxicity against warm-blooded animals.

Still another object is the provision of a method of stabilizing the above-mentioned compositions to permit storage without corrosive action and without loss of insecticidal activity.

Numerous other objects will be apparent from the description of the invention which is a preferred embodiment thereof.

These and other objects are accomplished by chlorinating a mixture of (1) camphene, bornyl chloride, isobornyl chloride or a combination thereof, and (2) a pinene, including natural turpentines which have a high proportion of pinenes to a chlorine content of from about 50% to about 70% by weight. It is essential that alpha or beta-pinene, or turpentine be present in the mixture prior to chlorination. Other turpentine derived hydrocarbons, such as dipentene, can be used to replace the pinenes in part, but the dipentene should not be present in amounts greater than that of the alpha or beta-pinene or the combined mixture of the pinenes.

The use of chemical insecticides to reduce the destruction of agriculturally important plant life and to protect man and farm animals from insect pests has been practiced for many years. In comparatively recent years, certain specific chlorinated hydrocarbons have gained rather important usage for this purpose. Several halogenated hydrocarbons were spectacularly successful when first employed, but within a few years many undesirable insects developed a high resistance to the particular insecticides, so that frequent applications and increasingly higher concentrations are needed to keep the destructive insect population within reasonable bounds. Some of the chlorinated chemicals which are very effective insecticides are used only in the limited sphere of non-food crops, because of their high toxicity to man and animals. Such highly toxic compounds are not employed in household sprays for this same reason. Ideally, an insecticide should have a wide differential in relative toxicity for warm-blooded animals as compared with that of the insect pests. The compositions of this invention have an insecticidal activity about equal to that of chlorinated camphene with equivalent chlorine content, while the toxicity to warm-blooded animals is materially lower and is surprisingly near that of the relatively non-toxic chlorinated pinenes.

Camphene is a bicyclic hydrocarbon which can be prepared by isomerizing alpha-pinene in the presence of a catalyst such as expanded vermiculite, pyrophyllite, halloysite, prochlorite, clinochlore and others, under the influence of heat and, usually, an inorganic alkaline material.

Alpha and beta-pinenes are natural constituents of turpentine and can be produced by careful fractional distillation of the turpentine.

Dipentene is a racemic form of limonene which is widely distributed in nature. It can be prepared from alpha-pinene by heating the turpentine hydrocarbon to 250° to 270° C. under pressure.

To prepare the compositions of this invention, the preferred method is to mix the camphene with turpentine or one of the pinenes, which may or may not contain up to 50% by weight of dipentene based on the weight of pinene. Chlorine is introduced into the above-described mixture of turpentine hydrocarbons and derivatives. The chlorination is allowed to proceed until the chlorine in organic combination reaches a range of from 50% to about 70% by weight of the final mixture. Actinic energy such as ultra-violet rays or sunlight are preferably utilized as catalysts during the chlorination. Other chlorination catalysts such as red phosphorus, $PCl_5$ and organic peroxides can also be employed. The halogenation process is exothermic and requires no external heat in the initial stages of the reaction, but it may be desirable to warm the mixture to about 80 to 150° C. or slightly higher during the final stages when substitution is fairly slow. The HCl that forms is stripped from the mixture and may be dissolved in water for purposes of disposal. No solvent or diluent is required for the chlorination reaction. However, if one is desired, those solvents which are known to be inert toward chlorine may be used. A typical example of an inert solvent is carbon tetrachloride. Numerous other liquid, highly chlorinated hydrocarbons will also serve as solvents. It is to be understood that the temperature of chlorination is not critical, so long as it is held below the decomposition point of the chlorinated mixture which is about 200° C.

We have found that a mixture in which the camphene content ranges from about 37.5% to about 70% by weight and the other components comprise about 30% to 62.5% by weight of the mixture prior to chlorination, possesses the most favorable index of insecticidal activity combined with a low toxicity to warm-blooded animals. Reducing the camphene, bornyl chloride or isobornyl chloride content appreciably below 37.5% in the mixture tends to result in a marked decrease in insecticidal activity. A substantial increase in camphene, bornyl chloride or isobornyl chloride content above 70% by weight of the unchlorinated mixture results in an extraordinary increase in toxicity to warm-blooded animals without a corresponding increase in insecticidal activity. For most purposes, the best balance between insecticidal activity and toxicity to warm-blooded animals is a blend comprising about 45% to about 62.5% camphene and 55% to about 37.5% of one or a mixture of alpha-pinene, beta-pinene, or turpentine, or a pinene or turpentine with not more than 50% of its weight of dipentene. The blend referred to immediately above is that prior to chlorination. The most desirable chlorine content of the insecticide is between about 60% and 67% by weight of the chlorinated product.

The chlorinated compositions of this invention tend to decompose, in part, on standing. To obviate this, it has been found that the addition of minor amounts, from about 0.5 to about 5% by weight, or more, of alpha-pinene, beta-pinene, camphene or turpentine to the chlorinated hydrocarbon blend provides a novel method for stabilizing the insecticide, so that it can be stored over long periods of time without breakdown or corrosive action on container or container parts. The reason for the stabilizing action of these compounds is rather obscure. It is possible, however, that the chlorinated hydrocarbons tend to split out HCl, which, in turn, catalyzes further decomposition. The small amounts of the pinenes, camphene or turpentine may react with the HCl, as it is formed, to thus prevent any catalytic action and stop further decomposition. Quantities of pinene, camphene or turpentine above 5% by weight of the mixture also have a stabilizing effect, but it has been found that an amount greater than 5% is not necessary to stabilize the insecticide in concentrated form even over very long periods of time.

The activity of the compositions described herein is such that it may be, and preferably is, used in diluted form containing from about 0.1% to about 2% of the active ingredients. However, if desired, concentrations as high as 30% by weight can be used on non-food plants. The diluent can be an inert solvent such, for example, as diesel oil, kerosene, xylene, vegetable oils or alcohol. The chlorinated hydrocarbons of this invention are readily soluble in both aliphatic and aromatic petroleum fractions. The solubility in alcohol, however, is in the range of from about 12% to 14% for 95% ethyl alcohol and as high as 128 grams in 100 grams of absolute methanol.

Water emulsions can also be prepared by the use of small amounts of well-known emulsifying agents, such as water-soluble soaps, alkaline salts of alginic acids, sulfonated fatty acids and alcohols, sulfated fat, quaternary amines, and other well-known surface-active agents.

Emulsifiable concentrates containing 72% by weight of the chlorinated insecticide have been prepared. The chlorinated insecticide was also compounded with pyrethrins, rotenone, allethrin, piperonyl butoxide, and other knock-down agents, with which it is compatible. The use of a knock-down agent is desirable, since the chlorinated compounds of this invention are slow in this respect. Spray powders can also be formulated with finely-divided clay, fuller's earth, talc and other pulverulent materials. These insecticidal powders can be made by wetting the powdery material with the chlorinated hydrocarbons of this invention and mixing thoroughly, or they can be prepared by wetting a powdery material with a solution of the insecticide in a volatile solvent, such as chloroform, etc. Wettable powders can be prepared by adding an emulsifying or surface-active agent to the powder, either before, during or after the mixing operation. Sprayable dusts containing from about 1% to about 20% by weight of insecticide are preferred. A dust or wettable powder containing 40% active ingredient by weight was prepared.

An adhesive or "sticker" may also be added to the insecticidal composition. A suitable "sticker" is a polyethylene polysulfide formed by reaction of ethylene dichloride with a polysulfide. The resulting product forms a discontinuous film which tends to hold the insecticide on plant surfaces and prevents its running off by gravity or washing away by rain. In this manner the effective period of the insecticide is prolonged considerably.

The amount of the chlorinated compositions of this invention required for use as an insecticide may vary somewhat, but for household sprays the concentration of active ingredients ranging from about 0.125% to about 2.0% weight by volume is sufficient to control flies, mosquitoes and other household pests.

The examples which follow serve the purpose of describing the invention in detail and are not intended as limitations. All proportions are based on weight percentages unless specified otherwise.

*Example I*

To a mixture of about 62.5% camphene and about 37.5% alpha-pinene, in a glass-lined vessel, gaseous chlorine was added in the presence of ultra-violet light. The temperature of the reaction mixture was controlled at between 95° C. and 100° C. Chlorination of the mixture of the hydrocarbons was continued in the absence of any solvent until the halogen content was approximately 65% by weight. The HCl produced together with unreacted chlorine was removed by sweeping them from the reaction mixture with $N_2$ or air.

The product thus produced tends to decompose on standing. Therefore, 2% by weight of alpha-pinene was added to the chlorinated hydrocarbons. The addition of the pinene stabilized the insecticide, so that it could be held over long periods of time without corrosive action on metal parts of containers and without loss of insecticidal activity.

Chlorine analysis of the stabilized material showed that it contained 64.7% by weight of chlorine.

When tested for its effect on houseflies by a modified Peet-Grady method, an 0.05% solution in kerosene had a toxicity equal to OTI samples. An 0.125% solution in kerosene killed 95% of the flies and an 0.25% solution killed 97%.

For the purposes of checking the oral toxicity toward warm-blooded animals, 5 grams of the insecticide were dissolved in sufficient corn oil to make 100 ml. of solution. Various sized aliquots were fed to white rats. The results showed that the LD/0 was 2 ml., the LD/50 was 4 ml. and the LD/100 was 6 ml. of the corn oil solution. Chlorinated camphene containing from about 67% to 68% by weight of chlorine had an LD/0 of 0.5 ml., and an LD/50 of 2.5 ml. in corn oil solution of the same concentration as that described above. Another chlorinated camphene sample containing about 59.8% by weight of chlorine had an LD/50 value of 2 ml. in corn oil solution. The LD values were calculated on a kilogram body weight basis.

*Example II*

A mixture of about 62.5% camphene and about 37.5% alpha-pinene was chlorinated by the method described in Example I in the presence of a small amount (less than 0.1%) of silicone anti-foaming agent and then stabilized by the addition of about 2% alpha-pinene. This insecticide had 100% kill in 0.25% and 0.125% solutions in kerosene, when tested against houseflies by a modified Peet-Grady procedure. An 0.05% solution in kerosene had an OTI toxicity slightly greater than the standard OTI sample. The composition of this example had a chlorine content of 65.5% by weight. Oral toxicity against white rats was determined by the method described in Example I. The LD/0 value was 2 ml., the LD/50 value was 4 ml. and the LD/100 value was 6 ml. of the corn oil solution of the insecticide per kg. body weight.

Skin irritation tests were conducted using the composition of this example. Five groups of rabbits, each group containing five animals, were employed. 5 ml. of each test material was applied at 48 hour intervals for each of three inunction applications on clipped areas of the skin. Group A was treated with the undiluted composition. At the end of five days there was a definite scaling and ulceration of the treated areas which sloughed off and showed formation of new skin. Group B was treated with a 5% weight volume solution in kerosene. A severe thickening and encrustation, ulceration and sloughing took place within a period of five days. Group C was treated with the kerosene used for dissolving the insecticide mentioned in Group B. The kerosene alone had a skin effect identical with the 5% weight volume solution of the insecticide. Group D was treated with a 5% weight volume solution in white mineral oil. A very mild erythema was produced in five days. Group E was treated with pure white mineral oil used for dissolving the insecticide as described under Group D. The oil alone also produced a mild erythema in five days.

*Example III*

A mixture of 37.5% camphene and 62.5% alpha-pinene was chlorinated to a chlorine content of 65.8% by weight by the method of Exanmple I. An 0.05% solution in kerosene killed 35% of houseflies when tested by a modified Peet-Grady method, and 0.125% and 0.25% solutions in kerosene had 68 and 98% kill, respectively. The LD/0 of this sample was 4 ml., the LD/50 was 8 ml. and the LD/100 was 10 ml. of a 5% weight volume solution in corn oil per kilogram body weight, when tested on white rats.

*Example IV*

A mixture of 50% camphene and 50% alpha-pinene was chlorinated to a chlorine content of 66.4% by weight. This composition was also very effective in killing houseflies. It had an LD/0 of 6 ml., and LD/50 of 8 ml. and an LD/100 of 14 ml. in 5% weight volume solution in corn oil when tested against white rats.

*Example V*

A mixture of 70% camphene and 30% alpha-pinene was chlorinated in accordance with the method of Example I to a chlorine content of 68.4% by weight. An 0.125% solution in kerosene killed 98% of houseflies in Peet-Grady tests, and a standard OTI sample killed 40% in a control test. The warm-blooded toxicity data, showed that the sample had an LD/0 of about 4–6 ml., an LD/50 of 6 ml. and an LD/100 of 8 ml. of a 5% weight by volume solution in corn oil, when tested against white rats.

*Example VI*

A mixture of 60% camphene, 20% alpha-pinene and 20% dipentene was chlorinated to a chlorine content of 69.6% by weight in accordance with the method of Example I. This composition had an excellent insecticidal activity and a remarkably low toxicity for warm-blooded animals. The LD/0 was 4 ml., the LD/50 was 8 ml. and the LD/100 was 12 ml. of a 5% weight by volume solution in corn oil when tested on white rats.

Other mixtures of camphene, pinene and dipentene containing from about 40% to 70% camphene and from about 30% to 60% of a mixture containing equal parts of alpha-pinene and dipentene were prepared. In all instances, insecticidal activity of the compositions was very high and the warm-blooded toxicity was low and of such order that it could readily be adapted for household use.

*Example VII*

A mixture of 40% camphene, 30% bornyl chloride and 30% alpha-pinene was chlorinated in the dark without a diluent by employing gaseous chlorine in the presence of benzoyl peroxide as a catalyst. The final chlorine content of the composition was 65.8% by weight. This composition had very good insecticidal properties, and its warm-blooded toxicity was rather low.

*Example VIII*

A mixture of 50% bornyl chloride and 50% alpha-pinene containing about 65% by weight of chlorine was prepared. This composition had an exceptionally high insecticidal activity and its warm-blooded toxicity, while slightly higher than the camphene-alpha-pinene composition, was still satisfactory for a general purpose insecticide.

*Example IX*

A mixture of 62% camphene and 38% alpha-pinene was chlorinated with chlorine gas at a temperature of about 50° C. to a chlorine content of 51.7% by weight. This product had a satisfactory insecticidal activity against houseflies and had a low toxicity to warm-blooded animals.

*Example X*

A mixture of about 62.5% camphene and 37.5% gum turpentine was chlorinated by the method of Example I, to a chlorine content of 66%. At the end of the chlorination cycle the temperature was increased to about 150° C. to speed the rate of chlorination. The product had a very high insecticidal activity and a low toxicity to warm-blooded animals. It is to be understood that turpentine can replace the alpha or beta-pinene of the previous examples. All commercially available turpentines contain about 90% or more of a mixture of alpha and beta-pinenes, predominantly the alpha isomer. For this reason the turpentine can replace alpha or beta-pinene part for part without causing any marked difference in the characteristics of the final chlorinated product. Wood turpentine may sometimes contain slightly less than 85% pinenes, and in such instances correction may be necessary at the extreme ranges of pinene content of the examples herein.

*Example XI*

In some instances it is desirable to chlorinate the mixture of turpentine derived hydrocarbons in the presence of a compound which will add chlorine to form another compound that has a high insecticidal activity.

In the preparation of this example a mixture of 62.5% camphene and 37.5% alpha-pinene was blended with an equal weight of benzene, so that the final concentration of benzene was about 50% of the unchlorinated mixture. The chlorination of this sample was effected at a temperature of about 50° C. with ultra-violet light as a catalyst. By this means the benzene added chlorine to form benzene hexachloride while the turpentine derived hydrocarbons were chlorinated to a chlorine content of about 66–67% by weight. This mixture of chlorinated hydrocarbons made a very excellent insecticide. The proportions of benzene to turpentine derived hydrocarbons are not critical, but the temperature of chlorination must be controlled so as to prevent substitution of chlorine in the benzene ring and to favor addition of the halogen.

In this specification and the appended claims, the term "a body comprising a pinene" is intended to define alpha-pinene, beta-pinene, turpentine in which the combined alpha- and beta-pinene content is at least 85% or a mixture of these ingredients having a high pinene content.

In all of the examples, beta-pinene can be substituted in whole or in part for the alpha-pinene, and mixtures of the two turpentine hydrocarbons can be blended with appropriate amounts of camphene or bornyl chloride or mixtures thereof prior to chlorination to yield insecticides having a relatively low order of toxicity for mammalian animals and a high toxicity for insects. Also turpentine can be substituted in whole or in part for the alpha or beta-pinene, since the natural turpentines available are composed very predominantly of the pinene hydrocarbons.

The insecticides of this invention were also given extensive field tests. In the test described hereafter, the insecticide employed was prepared by chlorinating a mixture of about 62.5% camphene and 37.5% of a mixture of alpha and beta-pinene to a chlorine content of about 65% by weight. After the halogenation was completed, about 2% of unchlorinated pinenes were added as a stabilizer.

At dosage rates ranging from 0.5 to 1.25 lbs. per acre of the chlorinated insecticide of this invention applied to cotton in the form of an emulsion, the degree of kill ranged from 53.8% to 100% of the various insects normally infesting the plants. At dosage rates of 2.5 lbs. per acre the average mortality after 72 hours was 84%.

Emulsions applied at dosages of 0.3 to 0.15 lb. of the insecticide per acre killed from 18 to 100% of cotton leaf worms.

Emulsions containing 1 to 1.15 lbs. of the chemical composition per 100 gallons killed about 22 to 31% of cotton aphids, but a tendency to repel or irritate the insects was observed. After the second day the dense colonies of the aphids were broken up, and there was little feeding on the third day.

An emulsion containing 1.25 lbs. of insecticide per 100 gallons was applied at a rate of 65 gallons per acre on cotton infested with flower thrips. The percentage kill was not calculated, but there was a decided superiority in appearance of plants in treated areas and a lack of scarring around the base of the flower bud and in the growing tip.

Gladiolus plants infested with bean aphids were sprayed with an emulsion containing 1.0 to 1.15 lbs. of the insecticide per 100 gallons. In 72 hours the mortality ranged from 61 to 72%. No quick kill was observed, but irritation or systemic action set in strongly by the second day.

Seeds of beans, corn, cabbage and onions were placed in furrows where they became infested with mole crickets, earwigs and ants. An emulsion containing about 1 lb. of the insecticide per 100 gallons was sprayed over the seeds before closing the furrows. From 14 to 100% more plants survived in treated than in untreated plots one month after planting.

Escarole and celery were sprayed with an emulsion containing 1.5 lbs. of the insecticide per 100 gallons. The dosage rate was 1.5 lbs. per acre. This provided complete protection against cut worms.

A series of plots infested with Colorado potato beetle were treated at the rate of about 100 gallons per acre with an emulsion containing 2 lbs. of the insecticide per 100 gallons. A 100% kill of 1st, 2nd and 3rd instar larvae was obtained in all plots so treated.

An emulsion containing 2 lbs. of the insecticide in 100 gallons was sprayed on an area infested with Mexican bean beetle. The application rate was 100 gallons per acre. Seven days after the treatment the number of plants infested was only about 47% as great as in the untreated plots, and only about 50% as many adults were present on the treated plants as compared with the plants in the untreated check plots.

Grape vines infested with 2 species of leafhoppers and a leaf-skeletonizing larva were sprayed with an emulsion containing about 1.6 lbs. of the insecticide per 100 gallons. Within twenty minutes after the application, the leafhoppers became moribund or moved to the ground and adjacent unsprayed vines. Observations made two and three weeks after spraying showed that untreated vines were almost completely defoliated while the treated vines had begun to develop new foliage and were relatively free of insects.

Citrus trees were sprayed with an emulsion containing 1.5 lbs. of the insecticide per 100 gallons. Within 24 hours after the first application of the insecticide, the adult population of the citrus whitefly was reduced 85%. Following the 4th application, made at 10 day intervals, neither immature nor adult whitefly insects could be found.

Forage crops were sprayed at a dosage rate of 100 gallons per acre with emulsions containing 1.0 and 1.15 lbs. of the insecticide per 100 gallons. The population of grasshoppers, Diabrotica sorer and Lygus sp. was markedly reduced in the treated plots.

In laboratory tests against German roaches, 85% of the insects were dead 48 hours after being sprayed in a conventional spray tower with 0.6 ml. of a 2% solution of the insecticide in kerosene.

Army worms were permitted to feed on bean leaves dipped in an 0.125% emulsion. A 100% kill was obtained.

Melon aphids and large milkweed bug both are very susceptible to the insecticide.

Red spider mites were killed readily by dipping the insects in an 0.05% solution of the insecticide in kerosene.

The product of Example I was tested against insects attacking growing cotton and compared with a commercially available chlorinated camphene containing 67–68% by weight of chlorine. In each instance the treated plots were given two spray treatments with a dust, the second treating being made about three weeks after the first. The results of the tests are tabulated below:

TABLE

| Spray Material | 1st Spray, lbs./acre | 2nd Spray, lbs./acre | Uninfected Squares | Punctured Squares | Percent Stung |
| --- | --- | --- | --- | --- | --- |
| A. 10% dust of product from Example I | 10 | 12–15 | 114 | 30 | 20.8 |
| B. 20% dust of commercial chlorinated camphene | 10 | 12–15 | 156 | 32 | 17 |
| C. 10% dust of product from Example I | 10 | 12–15 | 175 | 36 | 17 |
| D. 20% dust of commercial chlorinated camphene | 10 | 12–15 | 177 | 26 | 12.8 |

Blocks A and B were adjacent a wooded area and were therefore open to reinfestation. Blocks C and D were in mid-field, and therefore protected from reinfestation.

From these data it is evident that a spray powder containing only 10% active material of this invention is substantially as effective as commercially available chlorinated camphene at twice the concentration. In each sprayed area numerous dead weevils and other insects were observed on the ground adjacent the plants.

When the chlorinated compounds of this invention are stored for a short time at high temperature or at room temperature over a long period of time, hydrochloric acid is found in the headspace area of the container. The addition of the stabilizing compounds described herein completely prevents the appearance of HCl in the headspace gases of the container. Samples with and without stabilizing agent were stored at room temperature and at 100° C.

In no case was HCl detected in any of the stabilized samples. Identical samples without stabilizer were found to yield HCl under identical storage conditions. The rate of HCl development is greater at the higher temperature of storage.

The wide spectrum of high toxicity to insect life and comparatively low toxicity to warm-blooded animals of the insecticide of this invention is very unique in view of the known high order of toxicity of chlorinated camphene containing about 65 to 68% chlorine by weight. Chlorinated pinenes and chlorinated dipentene containing about 65% chlorine by weight are relatively poor insecticides, but are considerably less toxic to warm-blooded animals than a chlorinated camphene of equivalent chlorine content. Our insecticides, however, are about ¼ to $\frac{1}{12}$ as toxic to warm-blooded animals as chlorinated camphene, even though the camphene content is about ⅔ of the original unchlorinated mixture, and the insecticidal activity of our insecticide is about equal to that of chlorinated camphene of equivalent chlorine content.

While we have disclosed specific examples of our invention, we do not thereby intend to limit ourselves solely thereto, for it will be evident that the precise proportions of the active ingredient may be varied without departing from the spirit and scope of our invention as defined in the appended claims.

We claim:

1. An insecticidal composition having a high order of toxicity for insects and a relatively low toxicity to warm-blooded animals comprising the product formed by chlorinating, in the presence of a catalyst, a mixture of from about 37.5% to about 70% by weight of a material selected from the class consisting of camphene and bornyl chloride and from about 30% to about 62.5% by weight of a body comprising a pinene to a chlorine content of from about 50% to about 70% by weight of the chlorinated product.

2. An insecticidal composition having a high order of toxicity for insects and a relatively low toxicity to warm-blooded animals comprising the products formed by chlorinating, in the presence of a catalyst, a mixture of from about 37.5% to about 70% by weight of (1) camphene; from about 30% to about 62.5% by weight of (2) a member of the class consisting of alpha-pinene, beta-pinene, and mixtures thereof to a chlorine content of from about 50% to about 70% by weight of the chlorinated product.

3. The composition of claim 1 in which the pinene is admixed with up to about 50% by weight of dipentene.

4. The composition of claim 1 in which the terpene mixture prior to chlorination is admixed with benzene.

5. The composition of claim 2 in which the camphene content of the unchlorinated mixture ranges from about 45 to about 65% by weight of said mixture.

6. The composition of claim 2 in which the chlorine content of the chlorinated product is from about 60% to about 67% by weight of said product.

7. The composition of claim 2 having added thereto up to about 5% by weight of an unchlorinated compound selected from the class consisting of alpha-pinene, beta-pinene, camphene and turpentine.

8. The composition of claim 2 having added thereto a stabilizing amount up to about 5% by weight of unchlorinated alpha-pinene.

9. An insecticidal composition having a high order of toxicity for insects and a relatively low toxicity to warm-blooded animals comprising the product formed by chlorinating, in the presence of a catalyst, a mixture of about 62.5% by weight of camphene and about 37.5% by weight of alpha-pinene, said mixture being chlorinated to a chlorine content of about 66% by weight of said product, said product having added thereto alpha-pinene in an amount up to about 5% by weight of said product.

10. An insecticidal composition having a high order of toxicity for insects and a relatively low order of toxicity for warm-blooded animals comprising the product formed by chlorinating, in the presence of a catalyst, a mixture of about 62.5% by weight of camphene and about 37.5% by weight of a mixture of a pinene and dipentene, said mixture being chlorinated to a chlorine content of about 66% by weight of said product, said product having added thereto a pinene in an amount up to about 5% by weight of said product.

11. In a method of stabilizing a halogenated insecticide comprising a chlorinated mixture of camphene and a hydrocarbon selected from the class consisting of alpha-pinene, beta-pinene, mixtures thereof, the step of adding up to about 5% by weight of an unchlorinated compound selected from the class consisting of alpha-pinene, beta-pinene, camphene and turpentine to said chlorinated mixture.

12. The method of claim 10 in which the stabilizing compound is alpha-pinene.

13. The method of claim 10 in which the stabilizing compound is beta-pinene.

14. The method of claim 10 in which the stabilizing compound is turpentine.

References Cited in the file of this patent

UNITED STATES PATENTS

| 1,966,881 | Braun | July 17, 1934 |
| 2,462,146 | Walcott et al. | Feb. 22, 1949 |
| 2,566,092 | Mayfield | Aug. 28, 1951 |
| 2,666,009 | Stayner | Jan. 12, 1954 |

FOREIGN PATENTS

| 942,388 | France | Feb. 7, 1949 |
| 951,920 | France | Apr. 25, 1949 |
| 624,176 | Great Britain | May 30, 1949 |

OTHER REFERENCES

Soap and Sanitary Chem. for June 1953, pages 157, 159, 161, 163, 177.

UNITED STATES PATENT OFFICE
CERTIFICATE OF CORRECTION

Patent No. 2,767,115                                             October 16, 1956

Abner Lyndale Schultz et al.

It is hereby certified that error appears in the printed specification of the above numbered patent requiring correction and that the said Letters Patent should read as corrected below.

Column 2, line 45, for "about" read -- above --; column 5, line 7, for "Exanmple" read -- Example --; column 10, line 13, before "mixtures" insert -- and --.

Signed and sealed this 3rd day of December 1957.

(SEAL)
Attest:
KARL H. AXLINE

Attesting Officer

ROBERT C. WATSON
                                                                       Commissioner of Patents